Figure 1:
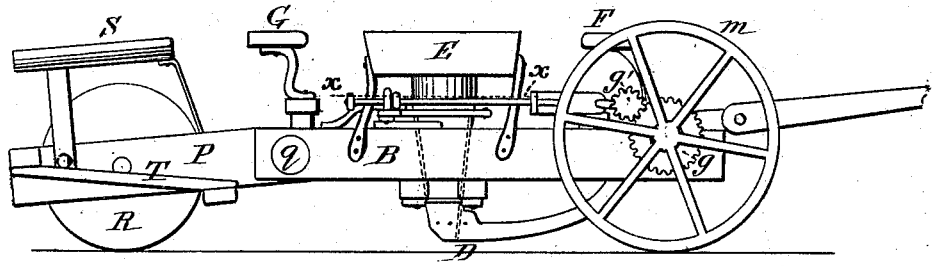

J. M. SPICKLER.
Potato-Drill and Planter.

No. 197,908. Patented Dec. 4, 1877.

Witnesses:
Floyd Norris.
D. A. Core

Inventor:
John M. Spickler
by Johnson & Johnson
Attys.

UNITED STATES PATENT OFFICE.

JOHN M. SPICKLER, OF TAYLOR RIDGE, ILLINOIS.

IMPROVEMENT IN POTATO DRILL AND PLANTER.

Specification forming part of Letters Patent No. 197,908, dated December 4, 1877; application filed October 2, 1877.

*To all whom it may concern:*

Be it known that I, JOHN M. SPICKLER, of Taylor Ridge, in the county of Rock Island and State of Illinois, have invented certain new and useful Improvements in Potato Drill and Planter; and I do hereby declare that the following is a full, clear, and exact description thereof, which will enable others skilled in the art to which it appertains to make and use the same, reference being had to the accompanying drawings, and to letters of reference marked thereon, which form a part of this specification.

The machine is adapted for planting potatoes by feeding them by hand into a many-chambered barrel rising from an open supply-tray. Pivoted valves are combined with the many-chambered barrel, and connected and operated in a manner so that each valve will control two chambers, and have an intermittent vibratory motion, in order that the four chambers may be opened successively and the potatoes dropped at equal distances apart in rows. For this purpose the two chambers of each valve are attended by a feeder, who drops a potato in each chamber at the time it is closed by said valve, so that the dropping by the two valves will be in regular succession; and their connections with the operating devices are such as to give a "dead motion" to the valves after each vibration. This is very important, as otherwise the working of the four-chambered barrel and its pivoted valves would not answer the purpose of insuring the successive opening and closing of all the chambers and the dropping of single potatoes at stated intervals. This dead motion is effected by allowing the pitman-rod connections with the operation crank-shaft to have a certain movement independent of the valve-connections, while the cranks of the operating-shaft are arranged so as not to work either always in the same or always in opposite directions, and hence there can be no simultaneous opening and closing of two dropping-chambers.

A single tube has been adapted for hand-feed from an open supply-box; but in such case the attendant feeds at intervals, governed by a noise or alarm made by a ratchet device on the hub of the driving-wheel.

My machine is organized to render the dropping automatic, and only requires the feed of the potatoes when the valves close the receiving-chambers.

This construction and arrangement of four chambers in a barrel, and a pivoted valve to each two chambers, render it necessary to have two boys to feed, and these feeders are arranged with special relations to the supply-tray and the open-top many-chambered barrel, so that each boy can attend to his own valved chambers, the seats being, for this purpose, arranged at the opposite sides of the supply-tray, while the driver's seat is arranged at the rear upon a separate frame. A single tube connects with the four-chambered barrel, and conducts each potato into the furrow made by the opener.

The dropped potatoes are covered by the action of a roller which follows directly in the path of the opener, and the supporting-frame of which is flexibly hinged in rear of the main frame, and provided with stops to prevent it from dragging the earth, and the covering-roller from sinking too deep into the covered furrow.

Figure 2:
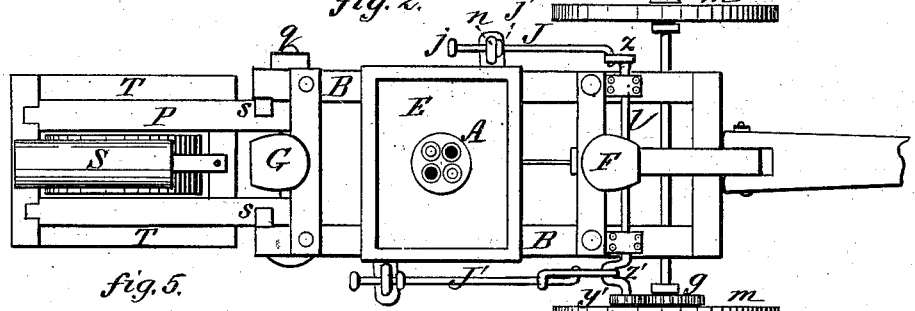
Figure 5:
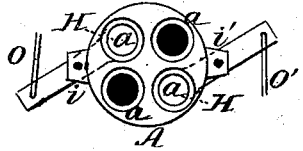
Figure 4:
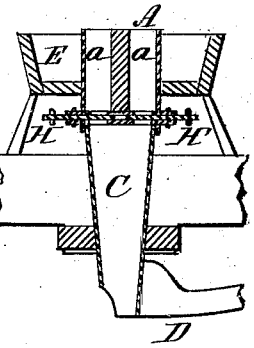
Figure 3:
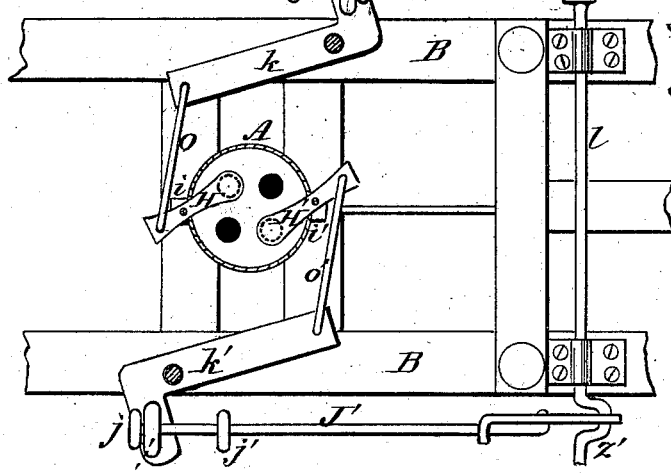

In the drawings, Figure 1 is a side elevation of my improved potato-drill. Fig. 2 is a top view. Fig. 3 is a horizontal section taken on dotted line $x\,x$, Fig. 1, showing the dropping-valves; Fig. 4, a section through the open supply-tray and open-top chambered dropper, and Fig. 5 the open top of the chambered dropper and their opening and closing valves.

The four-chambered dropper or barrel A is suitably supported at the center of a traveling frame, B, and a conducting-tube, C, leads from the bottom of said dropper or barrel to the heel of the opener D, to which it is rigidly attached. Surrounding the open top of said dropper or barrel is arranged a tray, E, for holding potatoes, which are picked therefrom by boys seated facing each other on the seats F G, and dropped alternately into right and left chambers of the barrel, each boy feeding the two chambers $a\,a$ next him, taking care to always feed a chamber when its bottom is closed, so that the opening thereof at regular intervals by the valves will insure proper spacing in the drill. The valves H H' are pivoted opposite each other, at the front and rear, to short arms $i\,i'$, projecting from the bottom of the barrel A, and the outer ends of these valves are connected by links $o\,o'$ with bent or bell-crank levers $k\,k'$, fulcrumed on the side timbers of frame B, and having their short arms connected by pitmen-rods $J\,J'$, with cranks $z\,z'$, on a shaft, $l$, which receives rotary motion through gear-wheel connection with the axle of traveling-wheels $m$. The inner ends of the valves H H' project under and vibrate close against the bottom of the barrel A when the machine is in operation.

The pitman-rod J, which is connected with the short arm of the bent or bell-crank lever $k$, passes loosely through an eye, $n$, on said short arm, and is provided with a head, $j$, and shoulder $j'$, the alternate striking of which against the eye $n$ vibrates the bent lever and, through link $o$, the valve H.

The vibration of the bent lever and valve is intermittent, owing to the distance between the head $j$ and shoulder $j'$ of the pitman, which permits said pitman for a portion of its stroke in each direction to pass through the eye $n$ without moving the lever, thus creating a dead motion in respect to the dropping devices, while the traveling continues, and thus are established intervals or spaces between the dropped potatoes from the valved chambers.

The devices just described, it will be seen, govern the opening and closing of the rear pair of chambers $a$ of the barrel, and the arrangement for the front pair of chambers $a$ is similar, as in Fig. 3.

The cranks $z\,z'$ are arranged at right angles to each other, so that the pitmen $J\,J'$ do not work either always in the same or always in opposite directions, as this would cause simultaneous opening and closing of two dropping-chambers and the deposit of two seed-potatoes where only one is desired; but by the arrangement of the cranks as shown, one pitman leads the other a half-stroke each way, thus insuring the successive opening of all the chambers and the dropping of single potatoes at stated intervals, which may be regulated by the relative proportioning of the meshing gear-wheels $g\,g'$. For instance, if the traveling wheels have a tread of six feet or seventy-two inches, and the driving gear-wheel mounted on the axle of said wheels has thirty-six teeth, the small gear-wheel on the pitman-shaft should have eighteen teeth, in order to plant nine inches apart, for then every seventy-two inches the machine traverses the pitman-shaft will make two complete revolutions, each pitman tripping a valve twice in each rotation, or at intervals of eighteen inches, and the lapping of these intervals, occasioned by the relative arrangement of pitmen-cranks heretofore explained, establishes spaces of nine inches between the dropped potatoes.

The front ends of the side timbers of the roller-frame P lap between the rear ends of the side timbers of dropper-frame B, and the two frames are jointed together by a cross-bolt, $q$, and from the ends of the outer timbers of frame B stops or arms $s$ project over the inner timbers in rear of the bolt $q$, and prevent the machine from dragging the ground at the joint; and the depth of covering may be also regulated by adjusting these arms higher or lower, so that a downward or upward pull is exerted on the roller, causing it to sink a greater or less distance. The driver occupies a stride-seat, S, arranged over the roller.

The attachment of the conducting-tube C to the heel of the opener D insures the deposit of the potato in the middle of the furrow, whereby it will be sure of being properly covered by the roller R, which follows directly in the path of the opener and upon the furrow. The driver rides upon the seat S, mounted upon this roller-frame, which has also side cleats T for the driver's feet.

The many-chambered barrel A rises to about a level with the top of the open tray E, and is in the center thereof, so that the tray holds the potatoes to feed the barrel, and the top of the many-chambered barrel opens above the open tray, which gives the required facility for handling by the feeders from the side seats, as stated.

I claim—

1. The four-chambered open-top fixed barrel A, in combination with the supply-tray E, the pivoted valves H H', and the conducting-tube C, said valves being adapted for operation with each pair of the chambers in planting potatoes in hills, as herein set forth.

2. The combination, with the four-chambered fixed open-top barrel A, the supply-tray E, and the pivoted valves H H', of the pitmen-rods $J\,J'$, the bell-crank levers $k\,k'$, connecting-rods $o\,o'$, and the operating crank-shaft $l$, as herein set forth.

3. The combination, with the four-chambered fixed open-top barrel A and the pivoted valves H H', of the pitmen-rods $J\,J'$, having the dead-motion connection $j\,j'$, with the valve bell-levers and the crank-shaft $l$, having the right-angled cranks $z\,z'$, for operation as described.

4. The four-chambered fixed open-top barrel A, the pivoted valves arranged to operate in relation thereto, as described, and the supply-tray E, in combination with the feeders' seats F G, arranged on opposite sides of the chambered barrel, as herein set forth.

5. The feeders' seats F G, arranged on opposite sides of the fixed open-top chambered barrel A, in combination with the driver's seat S, arranged upon the separate frame P in rear of the feeders' seats, as herein set forth.

6. The combination of the lapping jointed timbers of frame B and P and the stops or arms $s$, as and for the purpose set forth.

In testimony that I claim the foregoing as my own I have affixed my signature in the presence of two witnesses.

JOHN M. SPICKLER.

Witnesses:
  B. A. VANDERVER,
  JOHN SPICKLER.